Sept. 3, 1929. F. SMITH 1,726,864
EXTRA AIR VALVE FOR INTERNAL COMBUSTION ENGINES
Filed Sept. 6, 1927 3 Sheets-Sheet 3
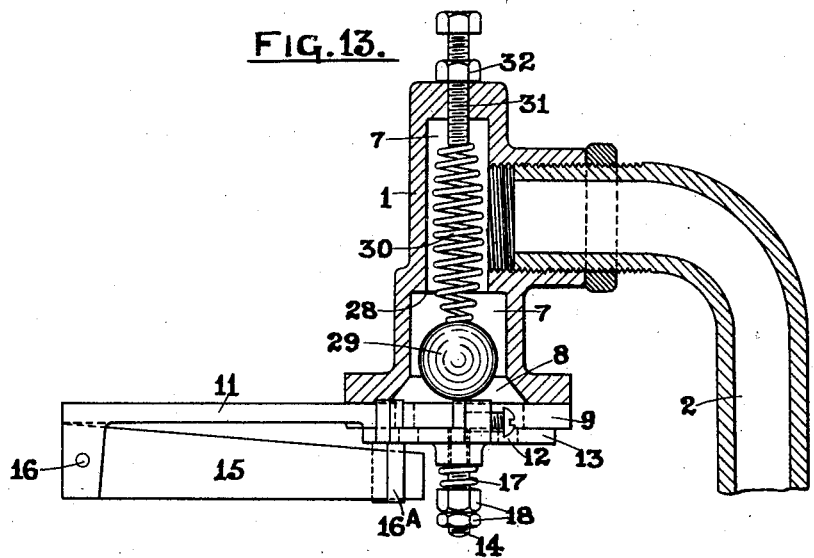
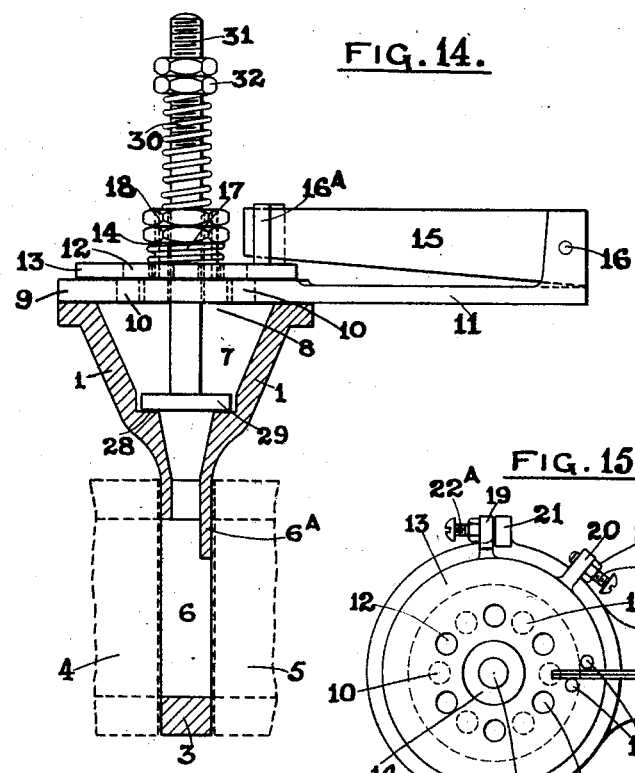
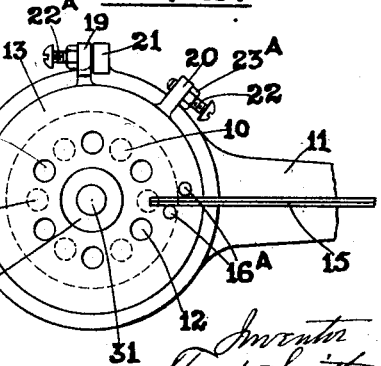

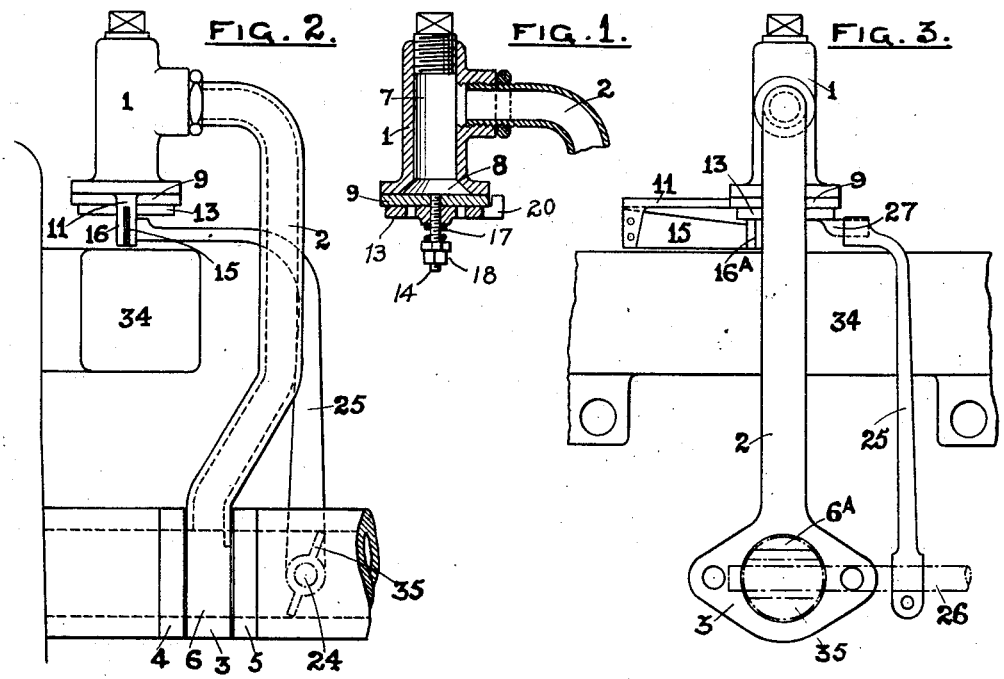
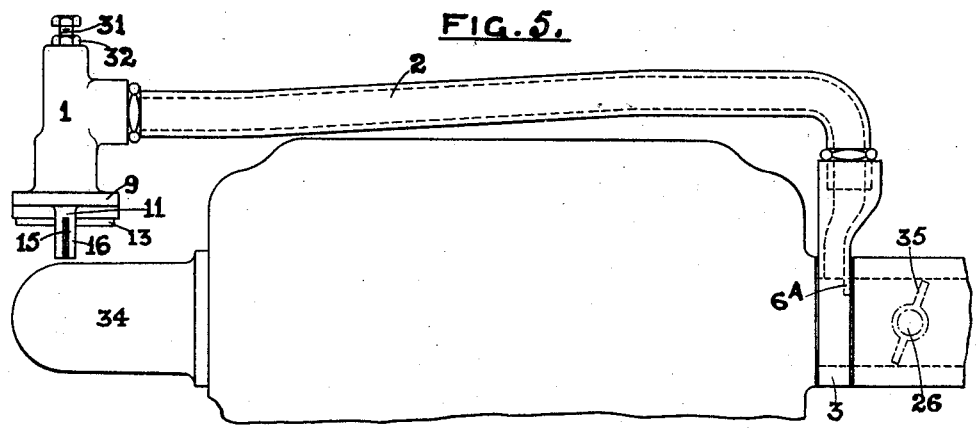
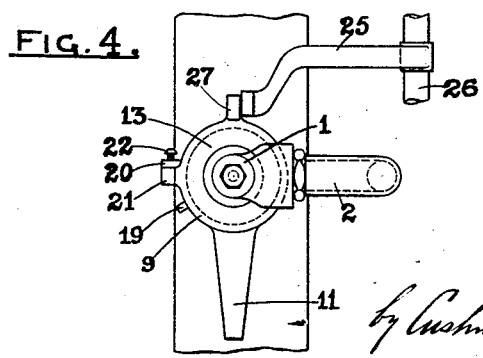

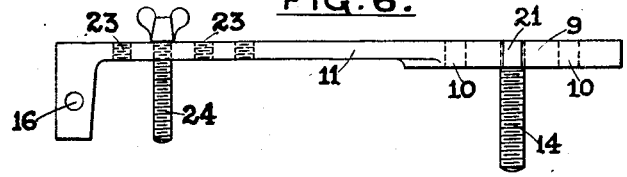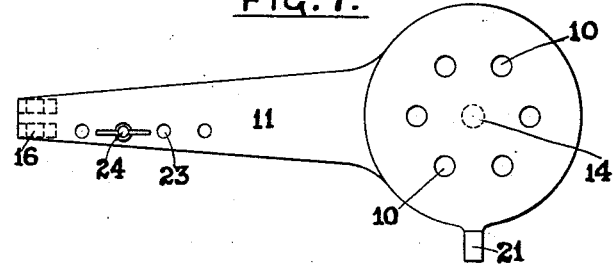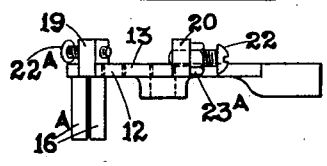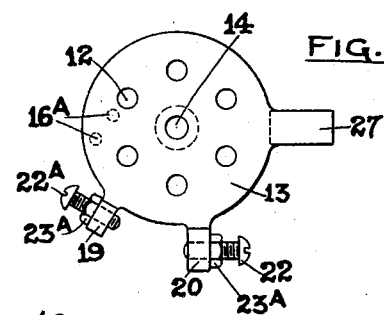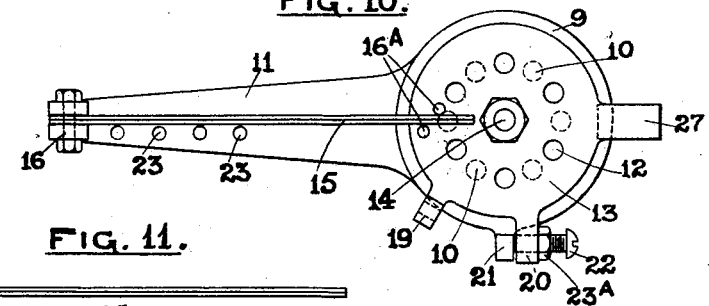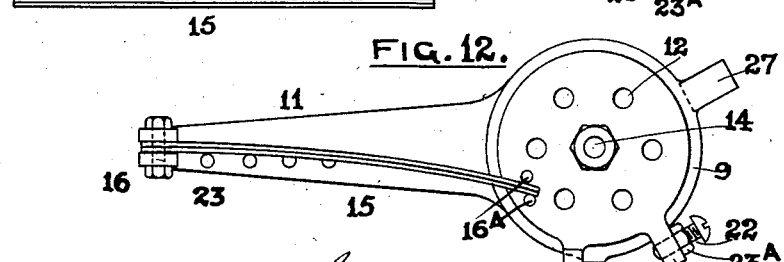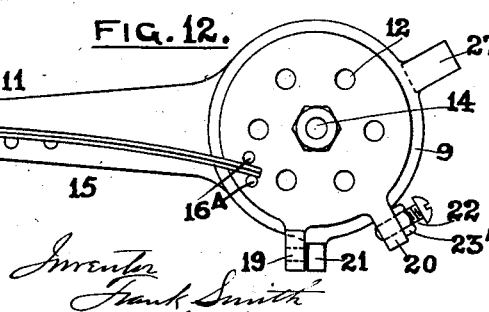

Patented Sept. 3, 1929.

1,726,864

UNITED STATES PATENT OFFICE.

FRANK SMITH, OF ELLAND, ENGLAND.

EXTRA AIR VALVE FOR INTERNAL-COMBUSTION ENGINES.

Application filed September 6, 1927, Serial No. 217,853, and in Great Britain September 16, 1926.

This invention relates to additional or extra air valves for admitting additional air into the induction pipe of internal-combustion engines, and has for its object the improved construction of said valves, and means whereby the air supply admitted to or passing through extra air valves is automatically controlled by the heat of the engine which thus determines the mixture supplied thereto giving the greatest efficiency in the circumstances. By varying the supply of additional air in accordance with the varying or increasing temperature of the engine, the customary manual or mechanical control of such valves may be dispensed with and considerable economy in fuel effected, the carbon deposits in the cylinders are reduced to a minimum, the mileage per gallon of petrol or the like fuel used is considerably increased, as well as the power or "pull" of the engine.

According to the invention, means are provided preferably mounted upon an extension or arm of the extra air valve cover or casing, in close proximity to or in contact with the exhaust pipe or the like of internal-combustion engines, whereby, upon becoming affected by the heat from said pipe during the running of the engine, it is adapted to correspondingly open ports admitting air thereto, and upon the cooling of the exhaust, to similarly close the said ports.

The extra air valve controlled by the aforesaid means, is suitably positioned upon the induction pipe, preferably between the engine and the throttle valve controlling the carburetter.

The aforesaid air valve is also adapted to be closed simultaneously with the closing of the carburetter throttle valve, by suitable means mounted upon the throttle valve spindle or connected with any other mechanism adapted to open and close the throttle valve or operating integrally therewith, adapted to engage and move the aforesaid disc so as to close the ports in the valve cover simultaneously, and upon again opening the throttle valve, allow the means heated by the engine to again move the oscillatory disc to admit air to the valve casing in accordance with the heat then developed by the engine. Or, as a modification, the means connecting the extra air valve with the throttle valve spindle may be dispensed with, and an additional valve be employed, which, upon closing the throttle valve, is pulled on to its seat, and upon again opening the throttle valve, it is again raised and held off its seat to admit air.

Where the exhaust pipe is upon the opposite side of the engine to that of the carburetter, a pipe or tube may connect the extra air valve positioned over said exhaust pipe, with the induction pipe. Or the ports in the casing may be dispensed with and the casing have an open end which may be closed by a bimetallic diaphragm or disc adapted to admit air to said casing upon becoming heated, by more or less buckling at its periphery. By these means the greater the heat of the engine the more air is admitted by the extra air valve, and the poorer becomes the mixture thus preserving the desired efficiency at all speeds.

I attain these objects by the means illustrated in the accompanying drawings, in which:—

Fig. 1 is a sectional elevation of the improved extra air valve, and means operating same.

Figs. 2 and 3 are elevations and Fig. 4 is a plan, showing the invention applied to internal-combustion engines where the carburetter and the exhaust pipe are upon the same side of the engine.

Fig. 5 is an elevation showing the invention applied when the carburetter and the exhaust pipe are upon opposite sides of the engine.

Figs. 6 and 7 are elevation and plan respectively, of the extra air valve cover, drawn to a larger scale.

Figs. 8 and 9 are elevation and plan respectively, of the perforated disc coacting with the valve cover or casing shown at Figs. 6 and 7.

Fig. 10 is a view of valve cover and disc assembled, with means heated by the engine, adapted to oscillate said disc, showing extra air valve fully closed.

Fig. 11 is a view of means adapted to flex upon becoming heated, employed for operating the extra air valve.

Fig. 12 is a similar view to Fig. 8, showing the extra air valve moved by Fig. 9 to full open.

Fig. 13 is a sectional elevation of the improved extra air valve and means controlling the admission of air thereto, operated by the heat of the engine.

Fig. 14 is a similar view to Fig. 13 of a modification of said valve.

Fig. 15 is a plan view of oscillatory disc shown at Fig. 2 coacting with the extra air valve shown at Figs. 1 and 2.

Similar numerals refer to similar parts throughout the several views.

Referring to Figs. 1 to 4 and 6 to 12 of the drawings: the extra air valve casing 1 is preferably connected to a pipe or tube 2 provided at the opposite end with a bored flange 3, adapted to fit between corresponding flanges 4, 5, upon the carburetter and the induction pipe respectively, to which it is secured. The bore 6 in the flange 3 which affords communication between the said carburetter and the induction pipe, also communicates with a suitable bore 7 in the casing 1 leading into the pipe 2, and is preferably provided with a lip or web 6$^A$ running across the top of the communication or opening upon the carburetter side of the valve, adapted to increase the pull of the engine upon the extra air valve and correspondingly weaken that upon the carburetter. The outlet 8 of the valve casing is preferably provided with a suitable cap or cover 9 having a number of holes or ports 10 formed therein, for the purpose of admitting when required, additional air into the induction pipe, and extending from the said cover is an arm or bracket 11. The ports 10 coact with corresponding ports 12 in a disc or plate 13 adapted to be moved upon a spindle or stud 14 projecting from the cover 9, by a metal combination strip 15 secured at 16 to the bracket 11, and projecting at the opposite end between two pegs 16$^A$ secured to the said disc 13. The disc 13 is adapted to frictionally engage the said cover by means of a spring 17 and a nut or nuts 18 screwing upon the stud 14. Lugs 19, 20 forming a part of the plate 13 are adapted to engage the stop 21 upon the cover, for the purpose of limiting the movement of the disc in both directions, and 22 is an adjusting screw mounted into the lug 20 for further regulating the said movement. A number of spaced holes 23 bored and tapped may be formed in the bracket 11, and a screw 24 inserted therein adapted to limit or control the flexing of the strip 15 when circumstances require it. Or, as an alternative a screw 22$^A$ mounted in the projection 19, may similarly regulate the movement of said strip, as desired, each adjustment being locked by the nut 23$^A$. A lever or arm is secured to the throttle valve spindle 26 and adapted to operate integrally therewith; the opposite end of the lever 25 being adapted to engage a projection or lug 27 upon the disc 13, to return the same to zero position shutting off the ports 10 simultaneously with the closing of the throttle valve 35.

Referring to Figs. 5 and 13 to 15: the lever 25 and stop 27 are dispensed with, the extra air valve casing 1 may also be connected to a pipe 2 as before described, or it may form a continuation of the bored flange 3, as clearly shown at Fig. 14. In Figs. 5 and 13, the bore 6 in the flange 3 also communicates with a taper or other suitable bore 7 in the said casing 1, which contains a valve seat 28 adapted to be engaged by a ball valve 29, adapted upon the closing of the throttle valve, to be pulled on to the seat 28 by the engine, in opposition to a spring 30 or other suitable elastic means, the tension of the spring being regulated by an adjusting screw 31 which is locked by a nut 32, mounted in the valve casing 1 and in engagement with the valve 29 normally resting upon the valve cover 9 when the throttle is open.

In Fig. 14, the spring 30 is placed upon the valve spindle 31 in engagement with a nut 18 mounted upon a boss 14 upon the cover 9, the tension of the spring upon the valve 29 being regulated by a nut or nuts 32 mounted upon the spindle 31. The frictional engagement of the disc 13 with the cover 9 is regulated by the nut or nuts 18 mounted upon the boss 14 into engagement with a spring 17. In order to obtain a certain lag in the movement of the valve 29 when opening to admit additional air to permit the engine to pick up speed on the original mixture when starting to open the throttle, the valve seat 28 may be formed at the bottom of a cylindrical bore forming an extension of the taper or similar bore 7, corresponding in diameter with that of the valve 29, whereby the time taken by said valve in traversing the cylindrical bore, gives the engine the desired opportunity.

When starting the engine cold, a suitable rich mixture is necessary and is allowed for in the design of the carburetter, the extra air valve meanwhile remains closed, but when the engine becomes more or less heated in running, this rich mixture is not required and its continued use entails an unnecessary consumption of petrol setting up the disadvantages before-mentioned. It is when the engine becomes heated that this heat is transmitted preferably through the medium of the exhaust pipe 34, to the metal combination diaphragm or strip 15, and sets up uneven expansion of the metals composing same, causing it to buckle in the manner clearly shown at Fig. 12, and operate upon the pegs 16 to move the disc 13 upon the stud 14, gradually bringing the ports 12 into a position to register with the ports 10, also clearly shown at Fig. 12, thereby admitting a corresponding amount of additional air to the induction pipe. Upon the parts commencing to cool, following the closing of the throttle, the strip 15 correspondingly tends to straighten out, returning the disc 13 to more or less close the ports 10. The hotter the engine becomes during continuous running and the more additional air, up to the maximum supply, is admitted to the induction pipe, and pro rata, the cooler the engine becomes, and less additional air is admitted up to the final closing of the ports 10.

Should it be necessary to close the throttle valve when the ports 10 are full open, the lever 25 immediately engages the projection 27 and returns the disc 13 in opposition to the strip 15 to zero position with the ports 10 fully closed. Upon again opening the throttle, the said disc is released, and the strip 15 again operates to move the disc to more or less uncover the ports 10 in accordance with the then existing temperature of the engine, or exhaust pipe.

In the modifications shown at Figs. 3, 13–15, the closing of the throttle valve causes the suction of the engine to pull the valve 29 on to its seat 28, to prevent additional air passing through the ports 10 to the induction pipe, without interfering with or affecting the action of the strip 15 upon the disc 13, which continues to function when the throttle valve is again opened.

In place of the disc 13 and the strip 15, a star plate, disc or the like of the same two metal combination may be employed, adapted to similarly close or uncover the said ports 10 when subject to heat from the engine exhaust pipe or the like.

What I claim as my invention, and desire to secure by Letters Patent is:—

1. In combination with the intake manifold of a gas engine, an extra air valve in communication with said manifold, a thermal device for operating the said air valve, a throttle valve controlling the manifold intake, and means connecting the said throttle valve and the said air valve whereby the latter is closed independent of and against the action of the thermal device, when the throttle valve is closed.

2. In combination with the intake manifold of a gas engine, an extra air valve in communication with the said manifold, a thermal device for operating the said air valve, a throttle valve controlling the manifold intake, and means actuated upon operation of the throttle valve for controlling the air valve independent of and against the action of the thermal device.

3. In combination with the intake manifold of a gas engine, an extra air valve in communication with said manifold, a thermal device for operating the said air valve, a throttle valve controlling the manifold intake, and an arm secured to the throttle valve spindle and adapted to close the extra air valve upon the closing of the throttle irrespective of the action of the thermal device.

4. In combination with the intake manifold of a gas engine, an extra air valve in communication with the said manifold, a thermal device for operating the said air valve, and a throttle valve controlling the manifold intake, the said air valve having an inlet controlled by a perforated stationary disk and perforated rotatable disk, the said rotatable disk being operable relative to the stationary disk by both the thermal device and the throttle valve.

In testimony whereof I affix my signature.

FRANK SMITH.